(12) United States Patent
Cartier et al.

(10) Patent No.: US 7,631,678 B2
(45) Date of Patent: Dec. 15, 2009

(54) HOT AIR DEVICE FOR THERMOWELDING BITUMEN MEMBRANES

(75) Inventors: Denis Cartier, St-Edmond-De-Grantham (CA); Pierre-Etienne Bindschedler, Obernai (FR)

(73) Assignee: Soprema Inc., Drummondville (CA)

( * ) Notice: Subject to any disclaimer, the term of this patent is extended or adjusted under 35 U.S.C. 154(b) by 132 days.

(21) Appl. No.: 11/997,875

(22) PCT Filed: Jul. 27, 2006

(86) PCT No.: PCT/CA2006/001236
§ 371 (c)(1),
(2), (4) Date: Feb. 4, 2008

(87) PCT Pub. No.: WO2007/014453
PCT Pub. Date: Feb. 8, 2007

(65) Prior Publication Data
US 2008/0210382 A1 Sep. 4, 2008

Related U.S. Application Data

(60) Provisional application No. 60/705,206, filed on Aug. 4, 2005.

(51) Int. Cl.
*B32B 37/00* (2006.01)
(52) U.S. Cl. .................. 156/497; 156/499; 156/574; 156/579
(58) Field of Classification Search .............. 156/71, 156/304.1, 304.6, 391, 497, 499, 544, 574, 156/579
See application file for complete search history.

(56) References Cited

U.S. PATENT DOCUMENTS

| 2,396,968 | A | | 3/1946 | Phillips, Jr. |
| 2,780,218 | A | | 2/1957 | Allen |
| 4,311,451 | A | | 1/1982 | Matumoto et al. |
| 4,488,868 | A | | 12/1984 | Tanaka et al. |
| 4,547,152 | A | | 10/1985 | Svendsen |
| 4,610,626 | A | | 9/1986 | Kikutani et al. |
| 4,855,004 | A | * | 8/1989 | Chitjian ..................... 156/359 |
| 5,935,357 | A | * | 8/1999 | Hubbard et al. ............... 156/82 |
| 6,155,321 | A | | 12/2000 | Bindschedler et al. |
| 6,394,795 | B2 | | 5/2002 | Fayerman et al. |
| 6,526,964 | B1 | | 3/2003 | Potter et al. |
| 6,581,663 | B2 | * | 6/2003 | Rubenacker et al. ......... 156/391 |
| 6,588,475 | B1 | | 7/2003 | Simon, Jr. et al. |

FOREIGN PATENT DOCUMENTS

FR 2608191 6/1988
WO 2005106326 11/2005

\* cited by examiner

*Primary Examiner*—James Sells
(74) *Attorney, Agent, or Firm*—Darby & Darby P.C.

(57) ABSTRACT

The invention concerns a hot air device for thermowelding membranes to surfaces. It includes an air inlet, a casing in fluid communication therewith, a combustion chamber mounted within the casing and spaced apart therefrom. The chamber has perforations allowing air to flow therein. The perforations allow some air to flow into the upstream section of the chamber producing an air-fuel mixture, and let the remaining air into the downstream section, thus shortening the flame within the chamber and producing hot air. The device includes an outlet portion for expelling hot air and not allowing a flame out therefrom, and a blower to force airflow from the air inlet through the chamber and out from the nozzle. The chamber may be pyramid or cone shaped and have a deflector to help direct air into the upstream section.

15 Claims, 9 Drawing Sheets

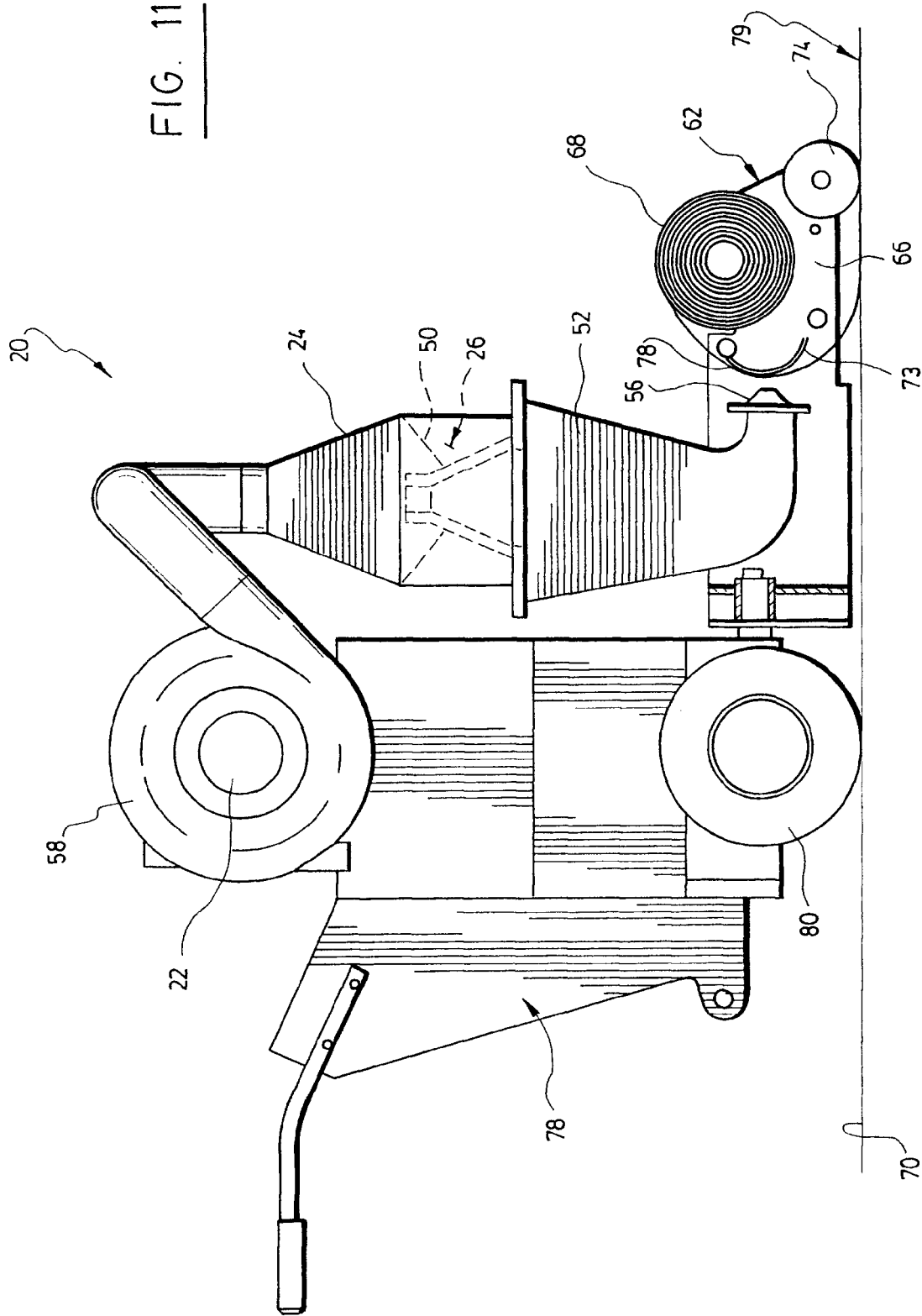

HOT AIR DEVICE FOR THERMOWELDING BITUMEN MEMBRANES

CROSS-REFERENCE TO PRIOR APPLICATION

This is a U.S. National Phase Application under 35 U.S.C. §371 of International Patent Application No. PCT/CA2006/001236 filed Jul. 27, 2006, which claims the benefit of U.S. Provisional Patent Application No. 60/705,206 filed Aug. 4, 2005, both of which are incorporated by reference herein. The International Application was published in English on Feb. 8, 2007 as WO 2007/014453 A1 under PCT Article 21(2).

FIELD OF THE INVENTION

The present invention generally relates to the thermowelding of bitumen membranes, and more specifically to a hot air device for heating and thermowelding strips of bitumen membranes.

BACKGROUND

Bitumen membranes are used for waterproofing, soundproofing and covering a variety of surfaces. Such membranes are often used in the fields of civil engineering, construction and public works. More specific applications include roofing, sidewalk, bridge and walkway coverings, among others.

For roofing and other waterproofing applications, bitumen membranes are often installed by welding membranes together so as to produce an impermeable seal between overlapping adjacent membrane strips and/or by welding the membrane directly to the surface. This installation requires heat to melt and thus thermoweld the borders and/or contact surfaces of the bitumen membranes. The membranes are welded together along the borders to produce a number of membrane strips welded together to cover a surface, or are fully adhered to the surface.

To weld the bitumen membranes together, the membranes must be heated to a temperature at which the bitumen melts or becomes liquid enough so as to enable good thermowelded adherence between the membranes. Bitumen membranes can be heated along an overlapping border to thermoweld strips or on the underside to weld membranes to another surface.

Already known in the prior art are torches and other devices used for installing bitumen membrane coverings. Portable and heavier apparatuses are known in the art for layering bitumen membranes onto various surfaces.

For instance, a live flame torch may be used for installation procedures, especially those procedures favoring a portable apparatus. The live flame directly heats the bitumen to enable thermowelding. A disadvantage of using a live flame torch is that live flames generally increase hazards, including the possibility of fire and other safety issues. For example, during roofing installations of bitumen membranes using an exposed flame torch, the flame can inadvertently produce smoldering and fires in the roof substructure. Heating by exposed flames may also increase the risk of carbonization of the binder of the thermoweldable surface, which decreases the quality of the inter-membrane weld. It may also be difficult to have control of the level of heating when using an exposed live flame.

There are also certain hot air devices known in the thermowelding industry. Most of them have a main casing through which air is blown. The casing also contains a live flame, sometimes produced by a combustion chamber or a burner unit. The airflow passes through the burner unit, part of it adequately mixes with a fuel to produce a flame, the air is heated by the flame, and then expelled. The hot air devices known in the art produce the hot air in burner units of numerous and varied construction.

U.S. Pat. No. 6,155,321 (BINDSCHEDLER et al.) describes a machine, which incorporates at least one unit for the production of hot air for thermowelding covering strips. The construction of the hot air units of this machine may render it more difficult to downsize to smaller machines or torches, and presents certain disadvantages with regard to producing the hot air. More specifically, BINDSCHEDLER et al. describe their machine as including a blade burner to heat the air. The blades' rotation enables the proper air-fuel mixture to enable a flame to ignite. The air flows around and through the blades, mixing with the fuel, and is heated by the flame before being expelled.

U.S. Pat. No. 6,588,475 (SIMON JR. et al.) describes a hot air welder including a flame distribution assembly having one or more fuel outlets directed in the same direction as the airflow. The air passes around the fuel outlets and proceeds downstream, thereby mixing with the fuel to be ignited, and flowing in the same direction as the live flame.

U.S. Pat. No. 4,547,152 (SVENDSEN) describes a device for heating a bitumen layer, including a casing in which a burner gas nozzle is mounted. The air flows around the burner gas nozzle where it is heated by the flame and proceeds, heated, out the rear exit of the casing.

U.S. Pat. No. 2,396,968 (PHILLIPS JR.) describes a torch for thermowelding membranes. The torch device includes a casing including counter-current air passageways which lead to orifices or jets circumferentially spaced about the fuel nozzle and positioned upstream therefrom. The air thus flows into the combustion tube near the fuel nozzle to produce the flame and be heated.

French Patent Application No. 2,608,191 (BERNASCONI) describes a device for thermowelding bitumen membranes having a casing in which is arranged a fuel nozzle. A first portion of air flows around and past the fuel nozzle and into a chamber, which is open at both ends. The chamber walls are hollow and filled with a second portion of compressed air, which is expelled from an outlet in the same direction as the first portion airflow and flame. Both portions of air are then heated and expelled from an exit nozzle.

Other patents in the art describe hot air devices for thermowelding, but provide little or no indication of the combustion chamber required to produce the hot air. The devices known in the art of bitumen thermowelding by hot air production use combustion chamber constructions that give rise to a number of disadvantages. For instance, the known constructions result in devices that are expensive, complicated, awkward or inefficient.

Furthermore, certain factors involved in producing hot air for thermowelding bitumen membranes have not been adequately explored in the prior art. A few of such factors are the air-fuel mixture for producing the flame, the balance between static pressure and flowrate, and the prevention of the flame exiting the exit nozzle of the hot air device.

Also, it is an ever present goal to improve the portability or maneuverability of hot air devices for thermowelding membranes. Thus an efficient use of space and equipment is quite desirable.

The prior art shows devices in which the production of hot air to thermoweld bitumen membranes is plagued by numerous disadvantages. There is thus a need for a hot air device that overcomes at least some of the disadvantages mentioned above.

SUMMARY OF THE INVENTION

The present invention responds to the above-mentioned need by providing a hot air device for thermowelding a thermoweldable membrane.

Accordingly, the present invention provides a hot air device for thermowelding a thermoweldable membrane where the device includes an air inlet for receiving air and a casing in fluid communication with the air inlet. The device also includes a combustion chamber mounted within the casing and spaced apart therefrom to define a space therebetween. The chamber is delimited by a wall provided with a plurality of perforations allowing the air to flow into the chamber. The chamber includes an upstream section, a downstream section and a fuel injector provided at the upstream section for providing fuel within the chamber. The perforations allow a portion of the air to flow into the upstream section of the chamber to produce an ignitable air-fuel mixture for producing a flame proximate the fuel injector, and let the rest of the air entering the casing into the downstream section, whereby the flame is shortened within the chamber and hot air is produced out of the downstream section thereof. The device also includes an outlet portion in fluid communication with the combustion chamber for receiving the hot air from the combustion chamber and which has a nozzle through which the hot air is expelled. The nozzle is sufficiently remote from the chamber so as to prevent producing the flame out therefrom. The device also includes a blower operatively connected to the air inlet to force an airflow from the air inlet through the chamber and out from the nozzle.

Preferably, the hot air device further includes at least one deflector extending transversally with respect to an airflow direction and mounted between the chamber and the casing. The deflector may assist in directing the portion of the air entering the casing into the upstream section of the combustion chamber.

Also preferably, the chamber is cone-shaped or pyramid-shaped to facilitate the desired airflow.

DESCRIPTION OF THE DRAWINGS

The distinguishing features and advantages of the invention will become apparent upon reading the detailed description and upon referring to the drawings in which:

FIG. 11 is a side view of the hot air device of FIG. 6, showing an example of the operation thereof.

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DESCRIPTION OF PREFERRED EMBODIMENTS

The present invention provides a hot air device for thermowelding thermoweldable membranes. The device finds preferred applications in laying bitumen membranes on surfaces such as streets, sidewalks, roofs, walls and other surfaces, for waterproofing, soundproofing or otherwise protecting the surface. Alternatively, the device may be used to thermoweld other thermoweldable membranes that are plastic-based or based on various petroleum by-products. The membranes may be thermowelded to adhere to surfaces or thermowelded to adhere to other membranes, depending on the desired application.

The invention is herein described and illustrated in relation to first and second embodiments.

The first embodiment, illustrated in FIGS. 1 to 5, substantially takes the form of a hot air torch 20. This embodiment may be used in a variety of applications, such as road-work, roofing and civil engineering applications, and is also useful in applications where portability is desired. It may effectively replace live flame torches in many of the latter's applications. The torch embodiment may also be adapted for advantageous use in a variety of applications in laying all sorts of bitumen or other thermoweldable membranes.

The second preferred embodiment, illustrated in FIGS. 6 to 11, takes the form of a non-portable welder. This embodiment may be used in many applications where a thermoweldable membrane is welded to an underlying surface, such as in bridge and parking lot covering and other civil engineering projects, road-work and roofing, to name a few. Often, the non-portable welder thermowelds a bitumen membrane as it is unrolled onto a surface.

Figure 4:
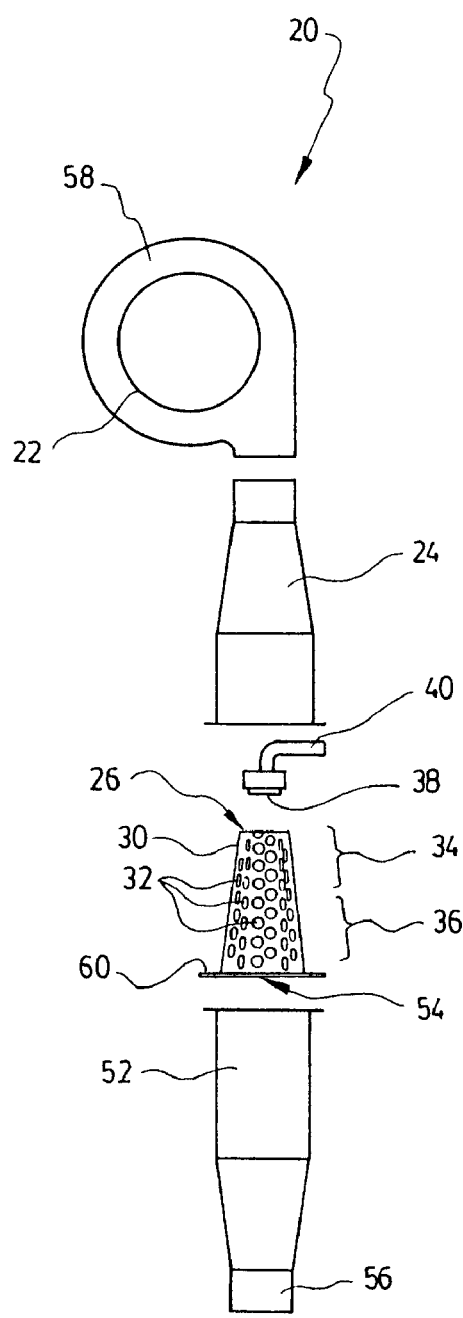
FIG. 4 is an exploded side view of the hot air device of FIG. 1.

Generally describing the invention while specifically referring to FIG. 4, the hot air device 20 is for thermowelding a thermoweldable membrane with respect to a surface (not illustrated). The device 20 includes an air inlet 22 for receiving air. Preferably, the air is received from the atmosphere at atmospheric pressure and may have a temperature of the working environment, be it sub-zero or a typical ambient temperature. There may also be two or more air inlets 22 to enable air to enter the device 20.

Figure 1:
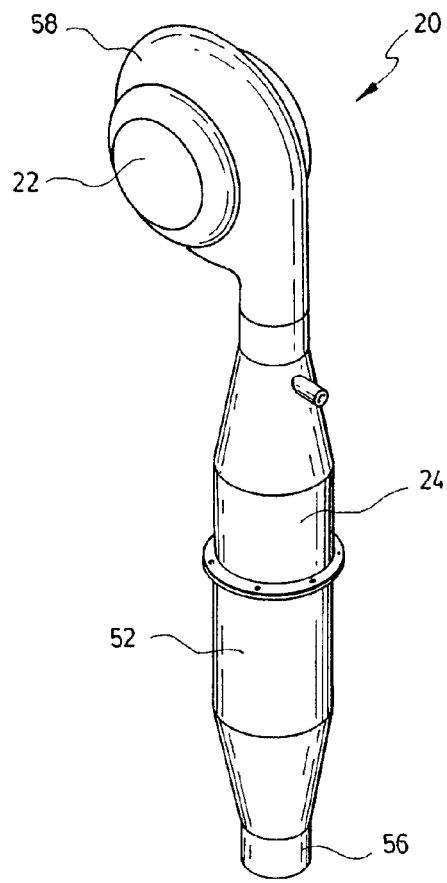
FIG. 1 is a perspective view of the hot air device, according to a first embodiment of the invention.
Figure 2:
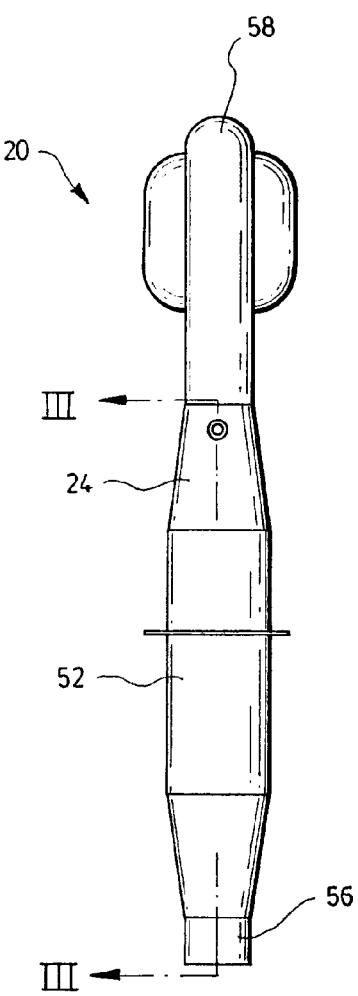
FIG. 2 is a side view of the hot air device of FIG. 1.
Figure 3:
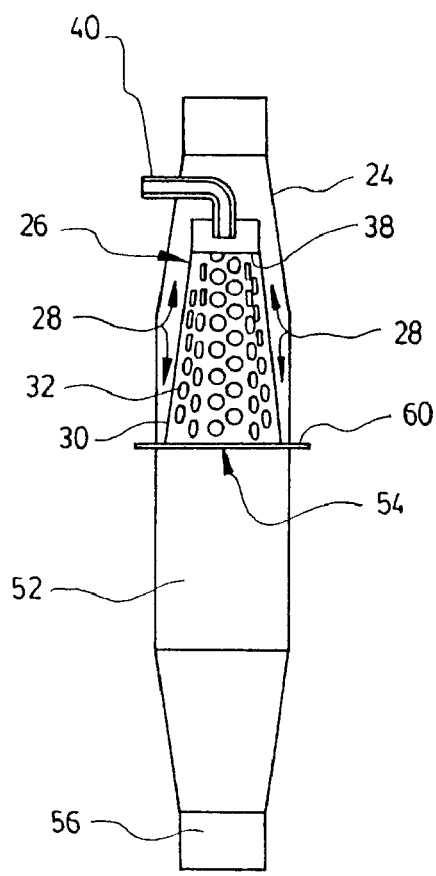
FIG. 3 is a cross-sectional side view along the line III-III of FIG. 2.

The device 20 also includes a casing 24, which is in fluid communication with the air inlet 22 to let the air flow therein. The device 20 further includes a combustion chamber 26, which is mounted within the casing 24. The combustion chamber 26 is also spaced apart from the casing 24 to define a space therebetween. FIG. 3, for instance, clearly illustrates this space 28 between the combustion chamber 26 and the casing 24. Thus, depending on the shape and arrangement of the combustion chamber 26 and the casing 24, the space 28 may take on a number of corresponding forms. For example, the space 28 preferably surrounds the perimeter of the chamber 26, but may be on one side only. Also, the space 28 may be symmetrical on all sides of the perimeter of the chamber 26, but, alternatively, may also be greater on one side or another.

Referring back to FIG. 4, the combustion chamber 26 is delimited by a wall 30 that is provided with a plurality of perforations 32. The perforations 32 allow the air to flow into the chamber 26. As may be appreciated from FIG. 3, the air travels into the space 28 between the casing 24 and the chamber 26, and is able to flow into the chamber 26.

Referring again to FIG. 4, the chamber 26 includes an upstream section 34 and a downstream section 36, with respect to the overall airflow direction. The chamber 26 further includes a fuel injector 38 provided at the upstream section 34 for providing fuel within the chamber 26. The fuel injector 38 may include a plurality of apertures (not illustrated here) for injecting the fuel. The fuel injector 38 is in fluid communication with a fuel inlet line 40 which feeds fuel thereto from a fuel source (not illustrated). The fuel source may be a pressurized tank or canister of various types of fuel, such as butane, propane or other ignitable fuels for creating a flame. Propane is the preferred fuel to be used. The hot air device may be adapted, however, to use other gas fuels if need be. The fuel injector 38 may be connected to a remote fuel tank via the fuel inlet line 40, but may also be connected to a local tank (not shown), that is, a fuel tank attached to the device 20. The fuel injector 38 may have a plurality of distributor apertures (not illustrated here) that distribute the fuel downstream, but may also be designed to distribute the fuel radially. The fuel injector 38 may also be designed to include other distribution elements, to aid in the fuel-air mixing process. In the illustrated embodiments, the fuel injector 38 provides fuel in a concurrent direction with the airflow direction through the chamber 26. More will be discussed with regard to these fuel and air flow directions further below.

The perforations 32 of the chamber 26 allow a portion of the air to flow into the upstream section 34 to produce an ignitable air-fuel mixture for producing a flame (not illustrated) proximate the fuel injector 38. The perforations 32 also allow the rest of the air into the downstream section 36 of the chamber 26. The flame is thus shortened within the chamber 26 and hot air is produced out from the downstream section 36 thereof. Preferably, the chamber 26 is tapered, the upstream section 34 being narrower than the downstream section 36.

Figure 9:
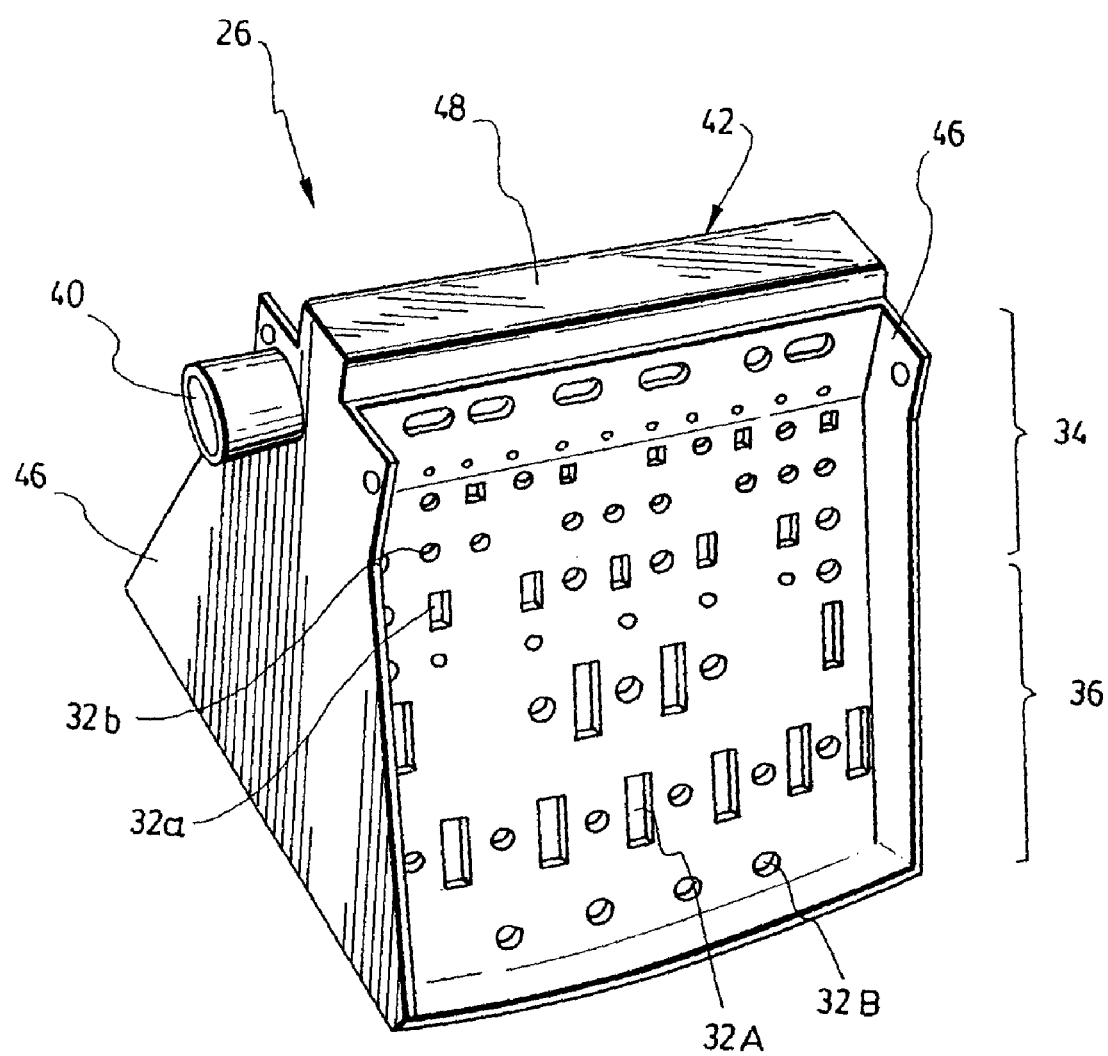
FIG. 9 is a close-up open perspective view of a part of the combustion chamber of the hot air device of FIG. 6.

The perforations 32 may have a variety of shapes, sizes and orientations. As illustrated in FIG. 9, the perforations 32 may be square 32*a*, 32A or circular 32*b*, 32B, and may also be relatively small 32*a*, 32*b* or larger 32A, 32B. Furthermore, the perforations may be, more or less, of increasing size from the upstream section 34 to the downstream section 36. This arrangement may promote airflow variations entering the chamber 26 to allow desired flame shortening effects. The perforations 32 may also, however, be arranged in a variety of different patterns on the wall 30 of the chamber 26.

Referring to the torch embodiment illustrated in FIG. 4, the combustion chamber 26 is preferably cone-shaped. This shape encourages some of the air to flow within the upstream section 34, while allowing the rest of the air to flow within the downstream section 36, via the perforations 32. In the case of this torch embodiment, the air flowrates are usually less than for grander, heavier embodiments. Typically, the air flowrate is about 4,400 standard cubic feet per minute (SCFM) for the non heated inlet air. The air is heated to between about 750° C. and 800° C. and thus approximately triples in volume. For this embodiment, therefore, the flame may be shortened due to the arrangement of the perforations 32 and the arrangement of the chamber 26 within the casing 24, to promote airflow within the upstream section 34 sufficient to create the adequate air-fuel mixture close to the fuel injector 38, while allowing the rest of the air to pass into the downstream section 36 where it is heated and enables the flame to be "cut" or in other words, disrupted. There is thus a combination of effects in the upstream 34 and downstream 36 sections that advantageously shortens the flame length. First, the flame is kept close to the fuel injector 38 in the upstream section 34 by encouraging the air-fuel mixture proximate the fuel injector 38, which is achieved by a portion of the air flowing into the upstream section laterally, that is, from the side via the perforations 32. Second, the flame is discouraged from extending past the downstream section 36 by the air entering laterally within that section. This also enables the heating of the air in a turbulent environment, which promotes fast, efficient thermal transfer.

Figure 8:
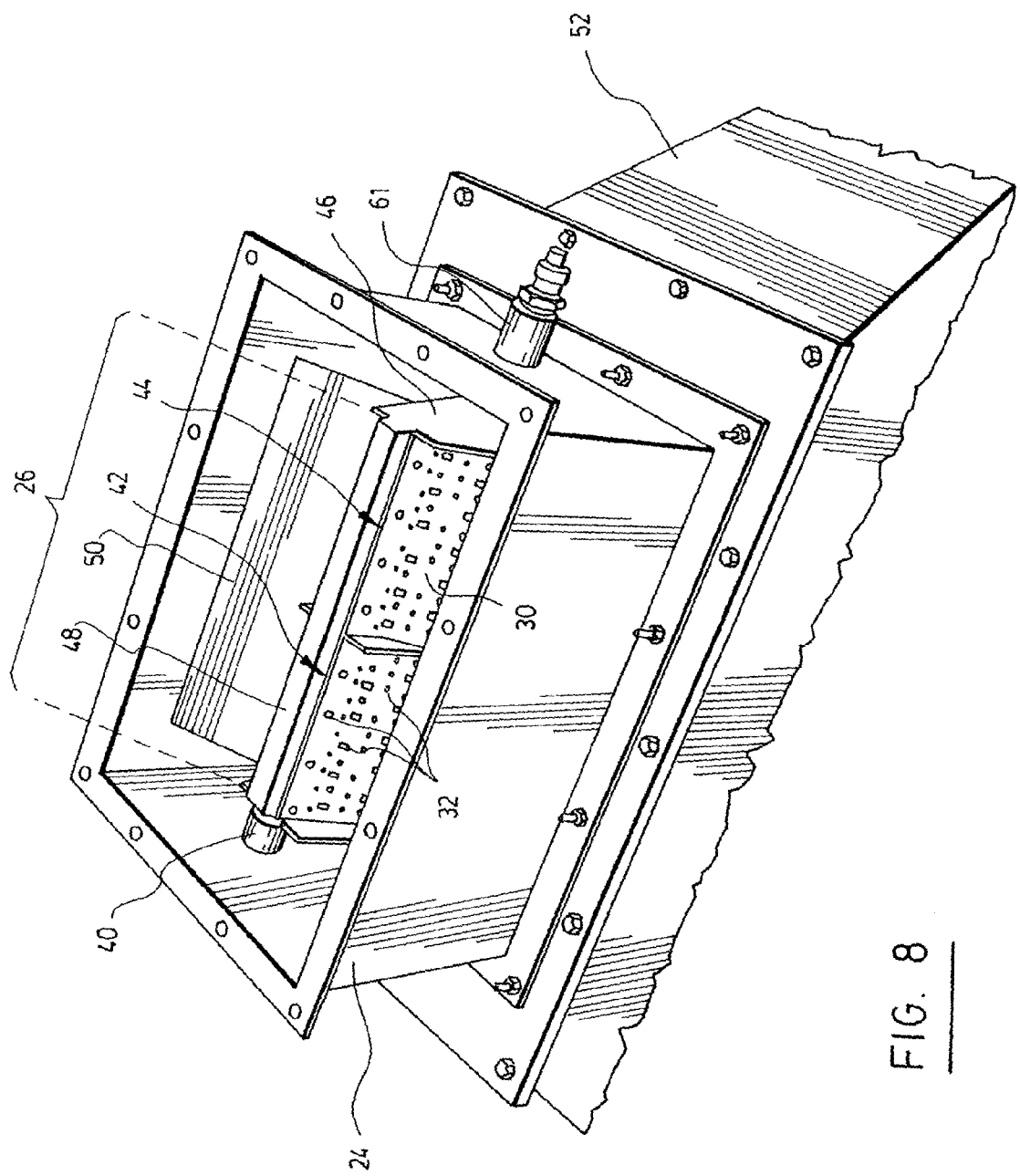
FIG. 8 is a close-up open perspective view of part of the casing and combustion chamber of the hot air device of FIG. 6.

Referring now to the non-portable welder embodiment of FIG. 8, the chamber 26 is preferably pyramid-shaped. In this particular embodiment, the chamber 26 includes first and second chamber sections 42, 44 mounted side by side to each other. Alternatively, only one chamber section 42 may be used, such a section being shown in FIG. 9. Preferably, each section 42 has solid side panels 46 and a top fuel distribution manifold 48 with a plurality of fuel apertures (not illustrated here) pointed in the downstream direction. Alternatively, the pyramid-shaped chamber 26 may have perforations 32 on all four lateral side walls 30 thereof.

Referring back to FIG. 8, the tapered, pyramidal arrangement of the chamber 26 allows the airflow that was substantially described above for the torch embodiment.

Indeed, forcing the air through the perforations 32, whether in the torch or non-portable welder embodiment, confers the entering air with certain flow regime characteristics, notably turbulent yet at least partly entering radially, that are suitable for combustion, heat transfer and flame shortening within the chamber 26. The orientations of the fuel injector 38 and perforations 32 as well as the direction of airflow are certain factors that may give rise to desirable air-fuel mixtures at desirable locations within the chamber 26.

Figure 10:
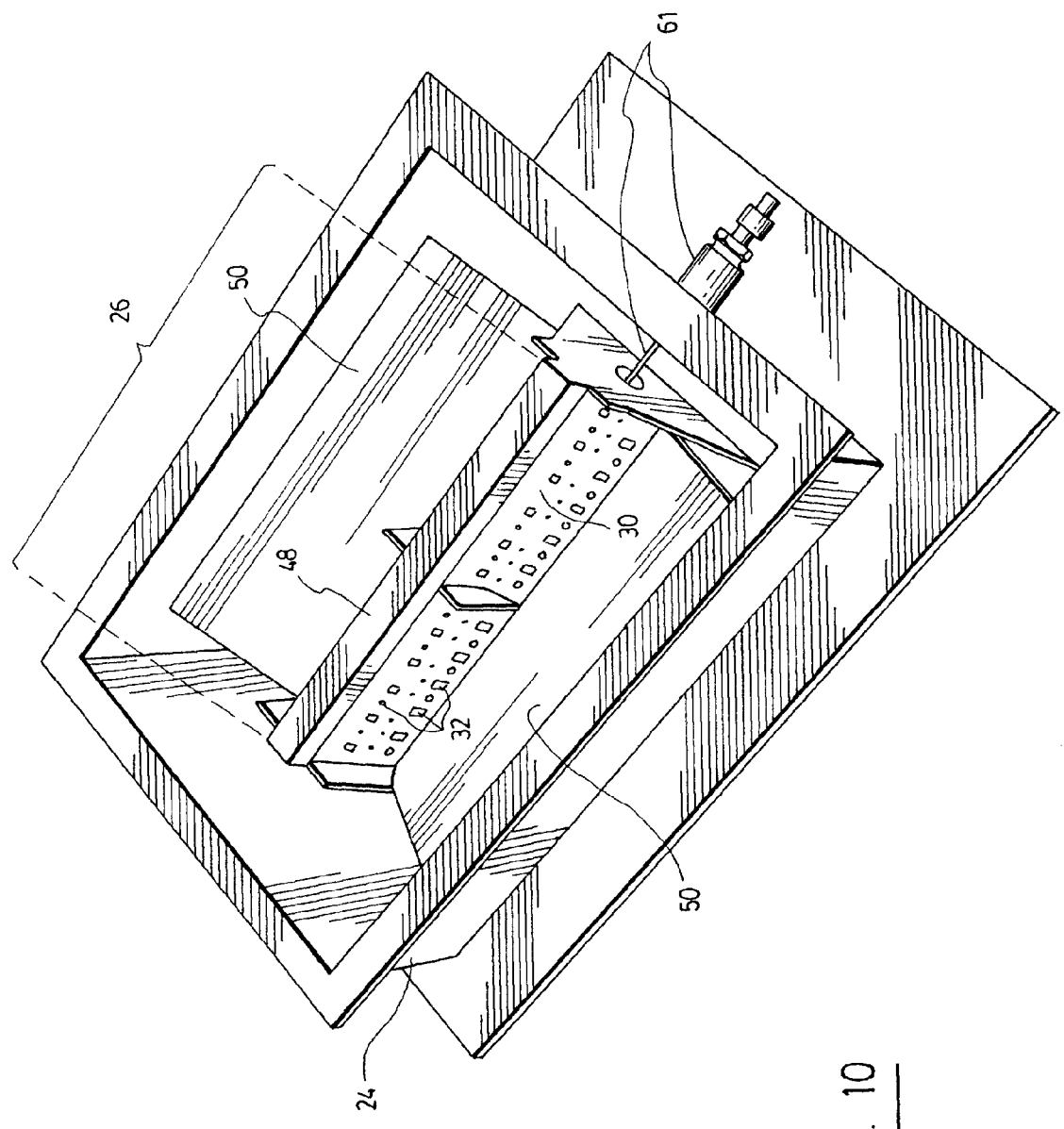
FIG. 10 is another close-up open perspective view of part of the casing and combustion chamber of the hot air device of FIG. 6.

Now referring to FIG. 10, the non-portable welder embodiment may further include one or more deflectors 50 to deflect the incoming air toward the upstream section 34. Preferably, the deflectors 50 extend transversely with respect to the airflow direction and are mounted between the chamber 26 and the casing 24. As illustrated, the deflectors 50 may be mounted directly to the wall 30 of the chamber 26 adjacent some of the perforations 32. The deflectors 50 are preferably obliquely angled with respect to the combustion chamber 26 and the airflow direction, and are pointing in a downstream direction. The deflectors 50 assist is directing the portion of the air into the upstream section 34 to further encourage the formation of an adequate air-fuel mixture, and this, in a region proximate the fuel injector (not illustrated here). As illustrated, the deflectors 50 are preferably rectangular plate-shaped monoliths that take up a substantial part of the space between the casing 24 and the chamber 26. Alternatively, the deflectors 50 may take on another shape and may, for example, include a plurality of smaller unattached elements.

It should be understood that the deflectors 50 are favoured in the non-portable welder embodiment because the air flowrates usually used are higher than for torch applications, and the construction and dimensions of the chamber 26 and casing 24 are different. More specifically, the air flowrate is about 7,400 SCFM for the non heated inlet air. The air is heated to between about 750° C. and about 800° C. and thus approximately triples in volume.

Of course, similar deflectors could be installed in the torch embodiment or other embodiments of the device according to the present invention to assist the airflow into the upstream section 34 of the combustion chamber 26.

Referring back to FIG. 4, the device 20 also includes an outlet portion 52, which is in fluid communication with the outlet 54 of the downstream section 36 of the chamber 26. The outlet portion 52 additionally has a nozzle 56, which is sufficiently remote from the chamber 26 to prevent producing a flame out therefrom. Thus, the outlet portion 52 is able to receive the hot air produced in the chamber 26 and expel such hot air out from its nozzle 56 without having a live flame being dangerously exposed. The device 20 thus confines the flame within the chamber 26 and, on occasion, part of the outlet portion 52. It is believed that the distance between the combustion chamber 26 and the exit of the nozzle 56 sufficient to prevent the production of a flame can be determined by any person skilled in the art and, as such, does not need further description.

The device 20 also includes a blower 58 mounted to the device for forcing an airflow from the air inlet 22 through the interior of the device 20 and out from the nozzle 56. The blower may be any conventional blower known to a person skilled in the art. It may be, for instance, a fan-type blower or a wheel-type blower. The blower 58 has sufficient power to provide the desired hot air flowrate.

Referring to FIG. 3, the chamber 26 preferably also has a peripheral rim 60 at the downstream end 54 thereof. The rim 60 extends to the casing 24 to define a lower limit to the space 28. This forces all of the air to pass from the space 28 into the chamber 26 before passing into the outlet portion 52. Alternatively, some of the air may be allowed to pass from the space 28 into the outlet portion 52. The rim 60 also preferably joins the casing 24, chamber 26 and outlet portion 52.

As mentioned above, the fuel injector 38 preferably provides fuel in a concurrent direction with the airflow direction. Thus, the flame extends in the same direction from the upstream section 34 to the downstream section 36 of the chamber 26. Indeed, the flame preferably extends within the interior cavity of the chamber 26, thus not directly extending toward a solid barrier, such as a metallic wall part of the device 20 structure, which could result in heat loss and possibly damage to the solid barrier. With the benefit of having substantially no solid obstructions, the flame is preferably able to extend unabated except for the shortening effects of the invention that were described hereabove.

Referring now to FIG. 10, the combustion chamber 26 may also be provided with a temperature measuring probe 61 to measure the air temperature or the flame temperature, as the case may be. This may be particularly useful to indicate whether combustion is taking place within the chamber 26, and the measuring probe 61 may send a signal to a processor (not illustrated) to increase, decrease or stop the fuel supply. Thus, the temperature probe 61 may act as a safety precaution. Other measuring probes (not illustrated) may also be incorporated into the device 20, to monitor the state of the combustion or other parameters of the device 20.

Figure 5:
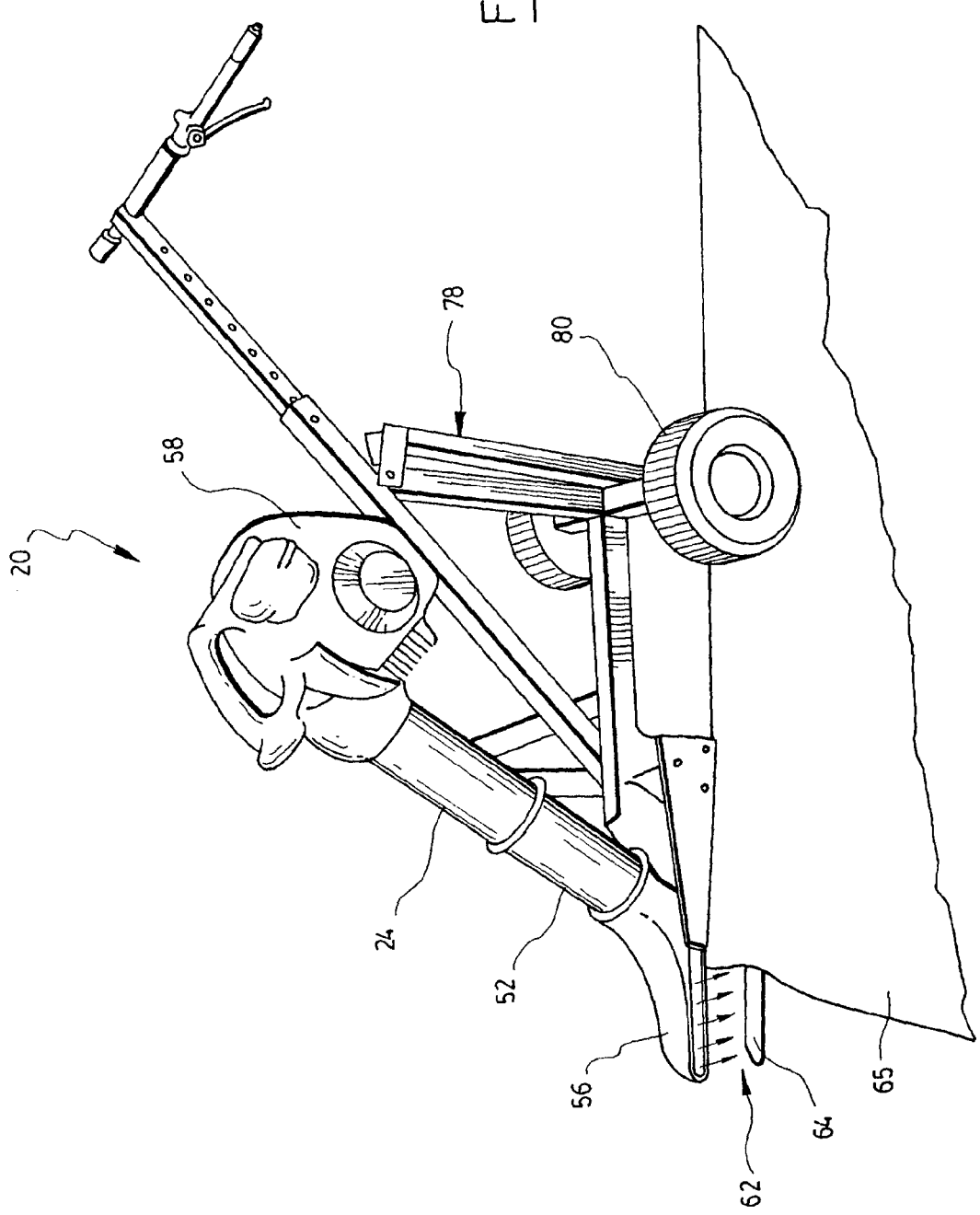
FIG. 5 is a perspective view of the hot air device of FIG. 1, showing an example of the operation thereof.
Figure 6:
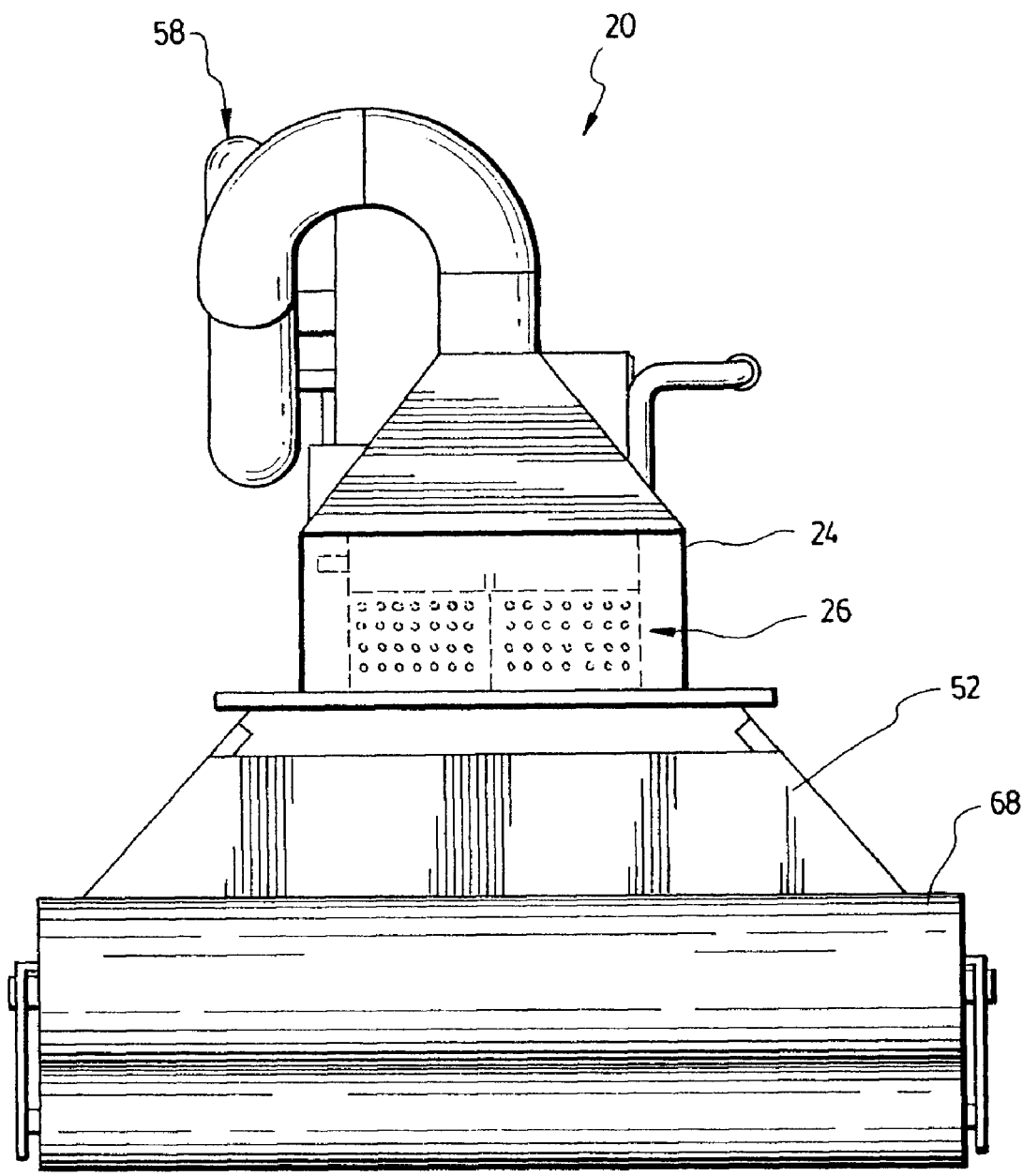
FIG. 6 is a front view of the hot air device, according to a second embodiment of the invention.
Figure 7:
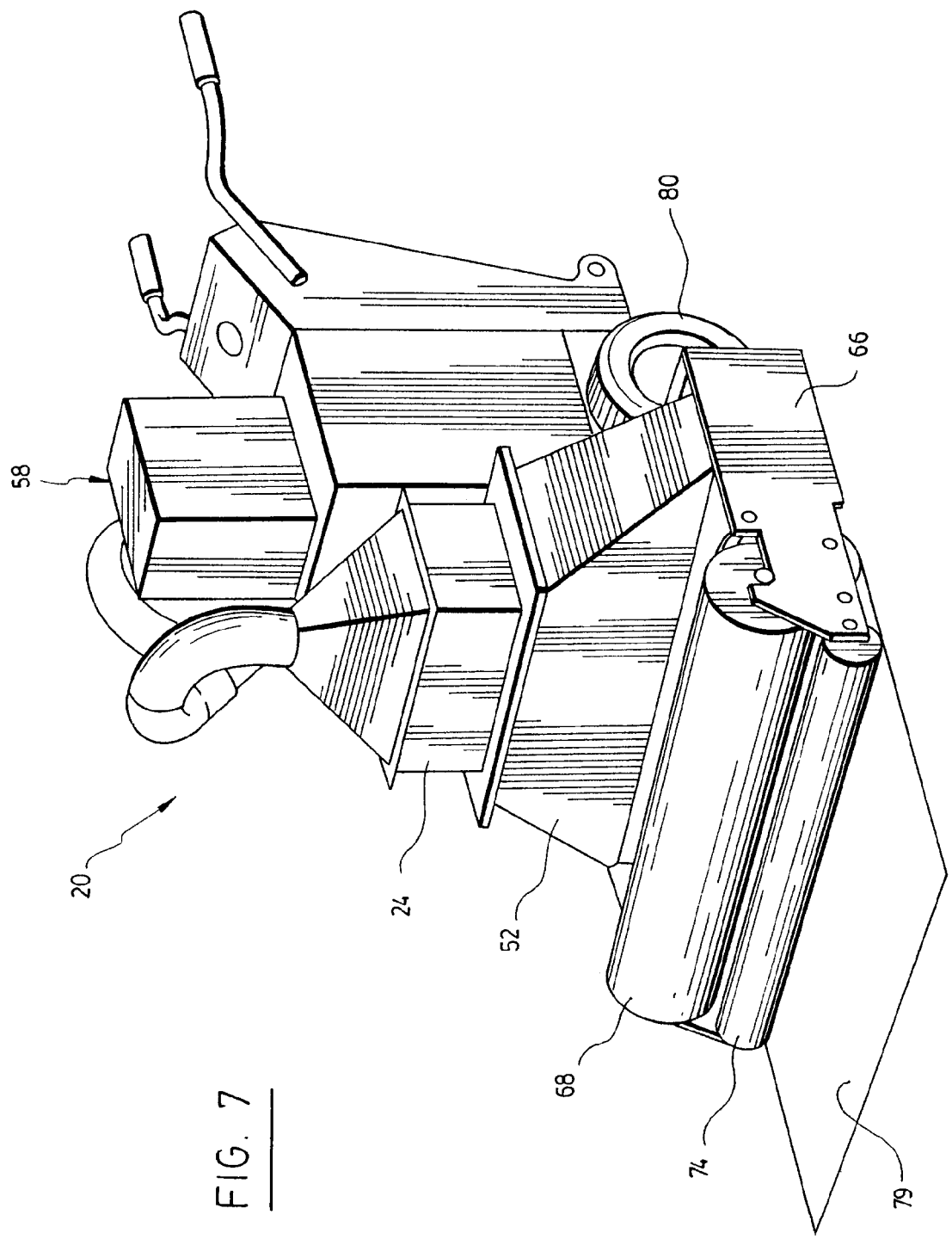
FIG. 7 is a perspective view of the hot air device of FIG. 6.

Referring to FIGS. 5 and 11, the device 20 further includes lifting means 62 for lifting the membrane relative to the surface to be covered. In FIG. 5, the lifting means 62 include a blade member 64, which functions by being arranged in spaced a parallel relation to the nozzle 56 of the outlet portion 52. The blade member 64 is slidable under the thermoweldable membrane 65 so as to lift the same from the surface. Often, the membrane 65 may be laid down, unrolled, etc, before the hot air device 20 thermowelds it, either to an adjacent membrane (not illustrated) or directly to the surface. It this case especially, the blade member 64 is able to lift an already laid membrane 65 to allow the hot air to heat the underside thereof and especially along the borders of the membrane 65 where connection to another membrane may be highly desirable. The membrane borders are often 8", 16" or other widths, but may have other dimensions.

In FIG. 11, the lifting means 62 include a roll mount 66 to which a rolled membrane 68 is mounted. The rolled membrane 68 is mounted at either end of the roll mount 66 and is unrolled while being applied to the surface 70 to be covered. The portion 72 of the membrane to be heated is preferably unrolled and supported over a half-moon element 73. The membrane is thus heated and then engages the surface 70 as the device 20 is displaced at an appropriate velocity. The device 20 may further include a pressure roller 76 for applying pressure to the thermowelded membrane to increase its adherence to the surface 70. once applied to the surface 70, the thermowelded membrane 79 is able to protect the surface 70 or insulate an area (not shown).

Referring back to FIG. 5, the torch embodiment of the device 20 is preferably attached to a chassis 78, which is provided with wheels 80. This arrangement is preferable when thermowelding the borders of overlapping membranes. Of course, the torch embodiment may also be hand-held by an operator, especially when being used for awkward or small applications, or when thermowelding the entire under-surface of a membrane.

In the torch preferred embodiment shown in FIGS. 1 to 4, the device 20 is cylindrical in shape. This shape increases maneuverability, facilitating handling by an operator, this shape is also advantageous for reducing pressure and heat loses, and is particularly suitable for the design of the torch. The elongated nature of this embodiment and the arrangement of the elements therein, enables the generation of hot air from an internal flame, and prevents production of such flame out from the nozzle's hot air exit 56. The flame is preferably kept substantially inside the combustion chamber 26, thus diminishing the risk of burning the membranes and inadvertently causing fires. The blower 58 power level and fuel distribution rate are varied according to the desired hot air flowrate and temperature. Of course, the air flowrates, the form of the combustion chamber 26 and the shape of the nozzle 52, may take on other embodiments in order to combine to avoid a flame at the exit nozzle 56.

The torch embodiment is a portable apparatus that may advantageously be used for roofing and other applications since it may be handled easily. Heating membranes with the device 20 is performed on the roofs or other surfaces themselves and therefore the torch must not exceed a certain weight or awkwardness. It should be noted that the torch may be used to thermoweld membranes to vertical surfaces such as walls, and also to other surfaces that favour the portability and maneuverability of the hot air device 20. The operator should be able to thermoweld the membranes at a desired rate, and may need to change the angle of incident hot air, the distance of the hot air exit nozzle 56 from the membrane or the method of hot air distribution. The portable nature of the torch embodiment of the hot air device 20 also enables small unwelded parts of membrane covers to be spot-thermowelded, to be repaired or adjusted.

The non-portable welder embodiment of the device 20, on the other hand, is particularly applicable for use on underlying surfaces such as roads, brides, roofs, and a multitude of civil engineering applications. It preferably expels hot air to contact an unrolling membrane along the entire width of the latter, as may be appreciated from FIGS. 6 and 7.

It should further be noted that the exit nozzle 56 is preferably maintained at a distance from the membrane's surface when thermowelding. Depending on the fusion temperature of the membrane (e.g. for bitumen membranes, between about 115° C. and about 120° C., usually), the distance is established to provide desired melting of the membrane while avoiding excessive heating thereof that could cause burning.

It should also be noted that the static pressure and the air flowrate are significant features of any hot air device. Depending on the desired application, the construction of the combustion chamber—as well as the casing, air inlet, outlet nozzle, etc.—should provide an optimal balance between static pressure and air flowrate. Some of the known hot air devices present tortuous airflow passages, dynamic blade members, or other obstacles that may undesirably influence the static pressure in operation. Other known devices present little to no obstacles to the airflow, and may display disadvantageous static pressure in operation. Both unbalanced situations where the static pressure is too high or too low, may result in a hot air device that is less adaptable to a variety of operating conditions or eventualities, which amounts to a significant disadvantage. The device 20 according to the present invention strikes an advantageous balance between these two parameters.

It is evident that the invention is not limited to the embodiment described and shown in the accompanying drawings. Modifications remain possible, particularly in terms of the construction of the elements of the torch and substitution of equivalent elements, without deviating from what has actually been invented.

The invention claimed is:

1. A hot air device for thermowelding a thermoweldable membrane, comprising:
    an air inlet for receiving air;
    a casing in fluid communication with the air inlet;
    a combustion chamber mounted within the casing and spaced apart therefrom to define a space therebetween, the chamber being delimited by a wall provided with a plurality of perforations allowing the air to flow into the chamber, the chamber comprising:
        an upstream section;
        a downstream section; and
        a fuel injector provided at the upstream section for providing fuel within the chamber;
        the perforations allowing a portion of the air to flow into the upstream section of the chamber to produce an ignitable air-fuel mixture for producing a flame proximate the fuel injector, and letting the rest of the air entering the casing into the downstream section, whereby the flame is shortened within the chamber and hot air is produced out of the downstream section thereof;
    an outlet portion in fluid communication with the combustion chamber for receiving the hot air from the combustion chamber and comprising a nozzle through which the hot air is expelled, the nozzle being sufficiently remote from the chamber so as to prevent producing the flame out therefrom;
    a blower operatively connected to the air inlet to force an airflow from the air inlet through the chamber and out from the nozzle.

2. The device of claim 1, further comprising at least one deflector extending transversally with respect to an airflow direction and mounted between the chamber and the casing, to assist in directing the portion of the air entering the casing into the upstream section of the combustion chamber.

3. The device of claim 2, wherein the at least one deflector is obliquely angled with respect to the combustion chamber and is pointing inward in a downstream direction.

4. The device of claim 3, wherein the at least one deflector is mounted to the casing and the chamber.

5. The device of claim 1, wherein the chamber is tapered, the upstream section being narrower than the downstream section.

6. The device of claim 5, wherein the chamber is cone-shaped.

7. The device of claim 5, wherein the chamber is pyramid-shaped, having four lateral sides.

8. The device of claim 7, wherein only two opposing lateral sides of the chamber are respectively provided with first and second sets of perforations.

9. The device of claim 1, wherein the perforations are of an increasing size from the upstream section to the downstream section.

10. The device of claim 1, wherein the wall of the chamber has a peripheral rim provided at the downstream end thereof and extending to the casing to define a lower limit to the space, thereby forcing all of the air to pass from the space into the chamber before passing into the outlet portion.

11. The device of claim 1, wherein the fuel injector provides the fuel in a concurrent direction with an airflow direction through the chamber, and the flame thereby extends in said concurrent direction from the upstream section toward the downstream section.

12. The device of claim 1, further comprising lifting means for lifting the thermoweldable membrane that has been laid flat to the surface, to facilitate the hot air expelled from the nozzle to flow thereunder.

13. The device of claim 12, wherein the lifting means comprise a blade member arranged in spaced and parallel relation to the nozzle of the outlet portion, and being slidable under the thermoweldable membrane so as to lift the same from a surface with respect to which the thermoweldable membrane is to be applied.

14. The device of claim 1, further comprising a chassis provided with wheels for displacing the device.

15. The device of claim 1, further comprising control means for controlling at least one of a displacement of the device, a flow of the air and a flow of the fuel.

* * * * *